March 25, 1958     A. F. BATSON ET AL     2,828,238
PROCESS OF MANUFACTURING EXPANSIBLE SEALING RINGS
Filed Oct. 18, 1955     2 Sheets-Sheet 1

Inventors:
Arnold F. Batson
Jerome J. Mestdagh
Paul O. Pippel
Atty.

March 25, 1958     A. F. BATSON ET AL     2,828,238
PROCESS OF MANUFACTURING EXPANSIBLE SEALING RINGS
Filed Oct. 18, 1955     2 Sheets-Sheet 2
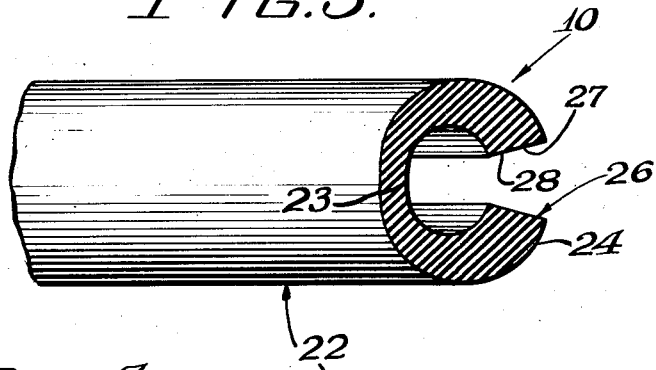
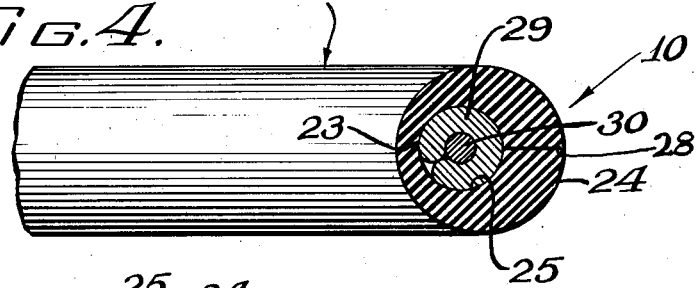
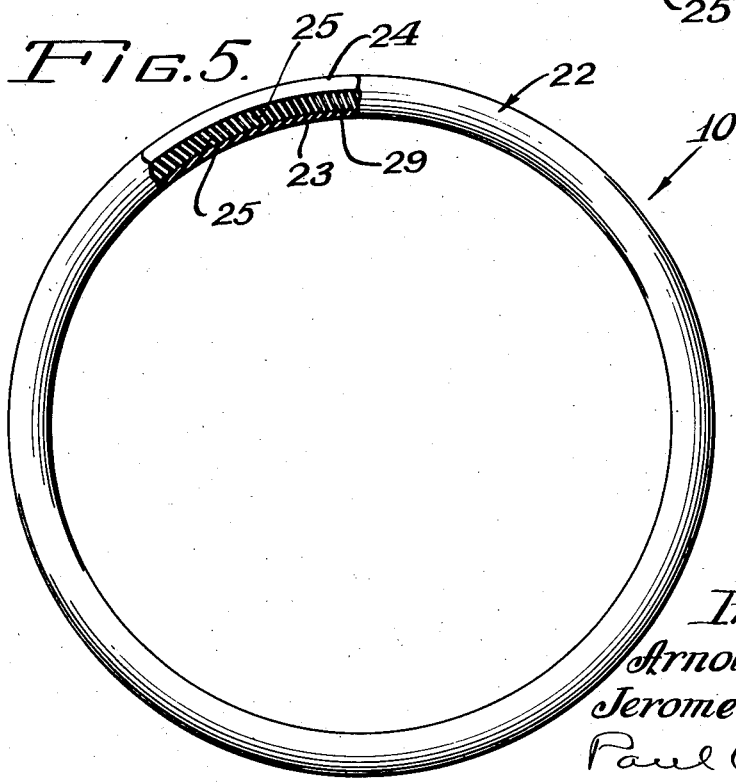
Inventors:
Arnold F. Batson
Jerome J. Mestdagh
Paul O. Pippel
Atty.

United States Patent Office 2,828,238
Patented Mar. 25, 1958

2,828,238

PROCESS OF MANUFACTURING EXPANSIBLE SEALING RINGS

Arnold F. Batson, New Lenox, Ill., and Jerome J. Mestdagh, Baltimore, Md., assignors to International Harvester Company, a corporation of New Jersey Application October 18, 1955, Serial No. 541,244

1 Claim. (Cl. 154—81)

This invention relates to an improved process for manufacturing expansible sealing rings. More particularly the invention relates to a process for producing expansible sealing rings particularly applicable to power washing cream separators.

In the patent to W. H. Harstick, 2,504, 261, patented April 18, 1950, a power washing cream separator is disclosed. In power washing separators of this type an expansible sealing ring is provided within the separating bowl, the said ring being responsive to certain high speeds of centrifugal force for sealing the discharge openings of the power washing separator bowl during the cream separating operation. During a lowering of the speed of rotation of the separating bowl the expansible ring contracts to permit the discharge of washing liquid from various openings provided in the bowl. Generally the sealing rings are extremely difficult to manufacture since it is desirable that the ring be provided with an annular spring which is calibrated to permit expansion of the sealing ring at a certain speed of operation. The molding of the rubber about the annular spring has been found very difficult and costly and it is a prime object of this invention, therefore, to provide an improved process for manufacturing sealing rings of the type used in power washing cream separators.

A still further object is to provide an improved process for assembling an annular spring with an annular rubber sheath to provide an expansible sealing ring.

A still further object is to provide an improved process of molding an annular sheath and for assembling a ring within the sheath, the sheath being sealed and cured with the spring disposed inside the ring to provide an expansible sealing ring for power washing cream separators.

These and further objects will become more readily apparent from a reading of the description when examined in connection with the accompanying sheets of drawing.

In the drawings:

Figure 3 is a detail, enlarged, fragmentary view of a portion, showing a cross section, of an expansible sealing ring disclosing a stage in the process of its manufacture;

Figure 4 is a cross sectional view similar to Figure 3 showing another stage in the process of manufacturing an expansible sealing ring; and Figure 5 is a plan view of an expansible sealing ring having portions broken away to show a spring disposed within the ring.

Figure 1:
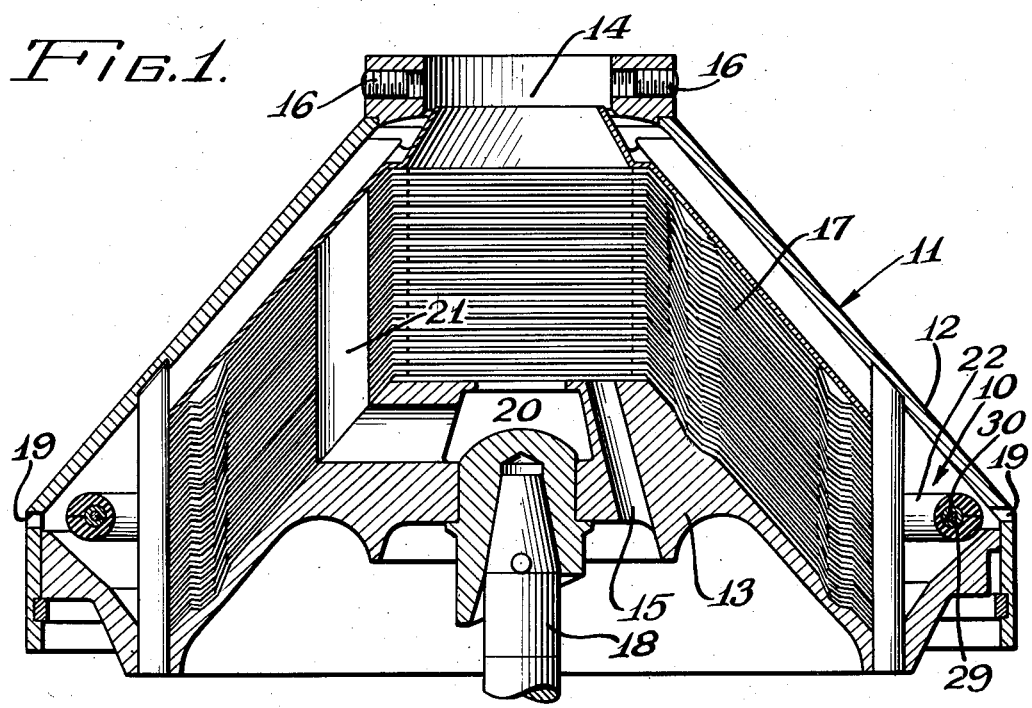
Figure 1 is a cross sectional view through a power washing cream separator bowl.
Figure 2:
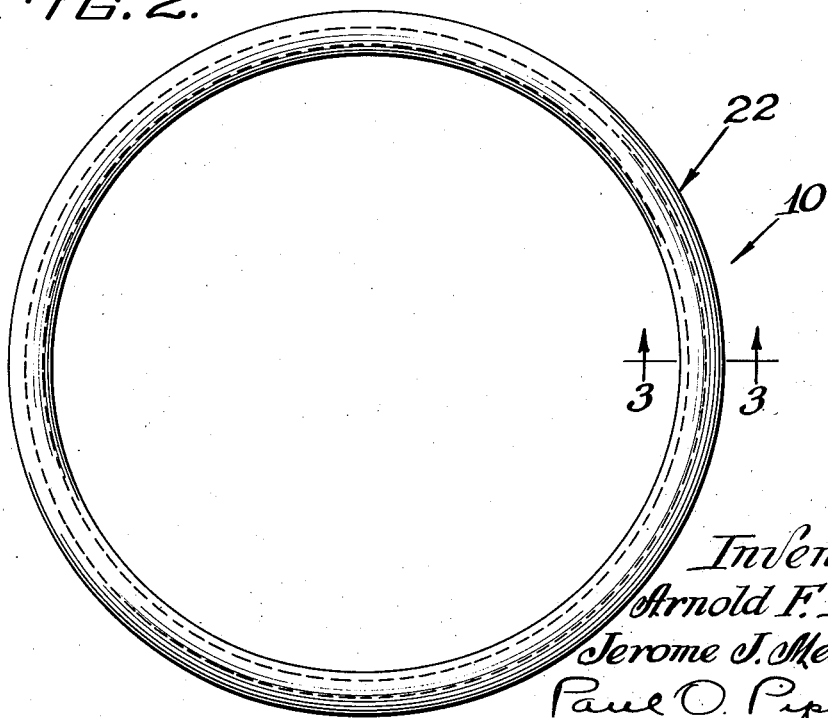
Figure 2 is a plan detail view of an expansible sealing element or ring for power washing cream separators.

An expansible sealing ring for power washing cream separators is generally designated by the reference character 10. The sealing ring 10, as best shown in Figure 1, is adapted to be positioned within a cream separator bowl generally designated by the reference character 11. The separator bowl 11 here disclosed is similar to the bowl disclosed in the aforementioned patent. The separator bowl 11 comprises an upper casing 12 and a lower casing 13. A milk inlet throat or passage is designated at 14 and a cream outlet 15 is provided in the lower casing 13. Skim milk outlets 16 are provided in the bowl 11. The bowl 11 also includes a disk pack 17 comprising a plurality of conventional separator disks. The bowl 11 is driven by means of a spindle 18 connected to a suitable power unit (not shown). The upper casing 12 is provided with a plurality of discharge outlets 19 which are positioned adjacent the sealing ring 10 and during operation, are regulated by the said ring. The separating bowl also includes a distributor 20 and one or more passages 21 for distributing whole milk to the disk pack 17 for separation.

The operation of a cream separator bowl is, of course, well known to those skilled in the art and a detailed explanation is not believed necessary. In the power washing type of separator, however, the sealing ring 10 is expanded at high speeds of rotation to seal the discharge outlets 19 whereupon normal separation of the whole milk can take place. After the separating operation it is generally desired to cleanse and wash the separating bowl and in this case washing liquid is supplied through the milk inlet 14 to the separating bowl and the speed of rotation of the bowl is, at a certain point, decreased so that the expansible sealing element will contract and permit the discharge of washing liquid at high velocity through the discharge outlets 19, thereby thoroughly flushing the bowl.

In the process of manufacturing the sealing ring 10 an annular rubber sheath 22 is first made. The annular rubber sheath may be made by a suitable mold die whereupon during the introduction of rubber the molding operation takes place. The mold die is suitably constructed to mold the sheath 22, the said sheath being provided with an inner wall 23 and an outer wall 24, the said walls, of course, being integral. The rubber sheath 22, as best indicated in Figure 4, is of circular cross section, the inner wall 23 and outer wall 24 providing a circumferentially extending bore 25. The sheath is also molded to have the outer wall 24 split as indicated at 26. This split 26 provides complementary circumferentially extending bonding surfaces 27, the said surfaces normally being disposed laterally or radially with respect to the axis of the ring.

After the sheath 22 has been molded into the shape indicated, the bonding surfaces 27 are subjected to a buffing or slight roughing operation after which a thin even coat of an adhesive is applied with the bonding surfaces in an out-of-engagement position as indicated in Figure 3. The adhesive utilized may be a conventional type utilized in the bonding of rubber. The adhesive is indicated at 28 and this adhesive is allowed to dry completely either by subjecting the ring to a rapid drying operation using warm air or permitting the air drying of the adhesive whereupon, of course, a longer drying period elapses. After the adhesive has thoroughly dried an annular metal spring 29 is placed in position within the bore 25. The spring 29 may include an expander ring 30 suitable to provide in the spring 29 a certain amount of pre-tension, the purpose of which need not be explained here.

After the mold ring spring 29 has been positioned as indicated in Figure 4, the dried adhesive surfaces are moistened by the application of a suitable solvent, the solvent toluene having been found to be satisfactory. After the adhesive surfaces have been moistened the bonding surfaces are placed into engagement and pressed together. The assembled ring is now placed into a mold or fixture which applies pressure on the outer wall to apply pressure to the engaged bonding surfaces and during a maintenance of temperature from approximately 250° F. to 275° F. the bonded surfaces are cured to effectuate a tight bond for the said surfaces. It has been found that at this temperature the ring is suitably cured within 20 to 30 minutes. The squeezing or pressure effect on the rubber causes a certain amount of the adhesive to squeeze outwardly from the bonding surfaces and such dried adhesive can be trimmed from the ring after the same has been cured.

Rings manufactured by this process have been found to be considerably cheaper and very effective in operation. Other temperatures than that stated, of course, can be utilized in the bonding of the bonding surfaces. It is, of course, also contemplated that the inner wall could be split in the same manner and the ring could be manufactured by this process.

Thus it is apparent that an improved process has been devised for manufacturing expansible sealing rings for power washing cream separators. It must be understood, of course, that changes in the process may be made without departing from the spirit of the invention or the scope thereof as defined in the appended claim.

What is claimed is:

A process of manufacturing expansible sealing rings for power washing cream separator bowls, comprising the steps of molding an expansible material into an annular sheath having a generally circular cross section with inner and outer peripheral walls defining a circumferentially extending bore, one of the walls being split to define a pair of complementary circumferentially extending bonding surfaces, applying an adhesive to said bonding surfaces, drying said adhesive with the bonding surfaces positioned in an out-of-engagement relation, assembling an annular coil spring in said bore, moistening the adhesive with a solvent, immediately pressing the bonding surfaces in engagement with each other to form an assembled ring, and heating said ring at a sufficiently high temperature with the bonding surfaces maintained under pressure for a period of time to achieve bonding.

References Cited in the file of this patent

UNITED STATES PATENTS

| | | |
|---|---|---|
| 1,031,515 | Bluemel et al. | July 2, 1912 |
| 1,209,644 | Price | Dec. 19, 1916 |
| 1,492,363 | Edson | Apr. 29, 1924 |
| 1,586,737 | Geyer | June 1, 1926 |
| 1,828,925 | Christopherson | Oct. 27, 1931 |
| 2,482,570 | Acton | Sept. 20, 1949 |
| 2,670,313 | Young | Feb. 23, 1954 |
| 2,676,823 | Olson et al. | Apr. 27, 1954 |